Dec. 8, 1959  D. R. CLEMONS  2,915,808
METHODS OF MAKING ELECTRICAL CAPACITORS
Filed April 9, 1956
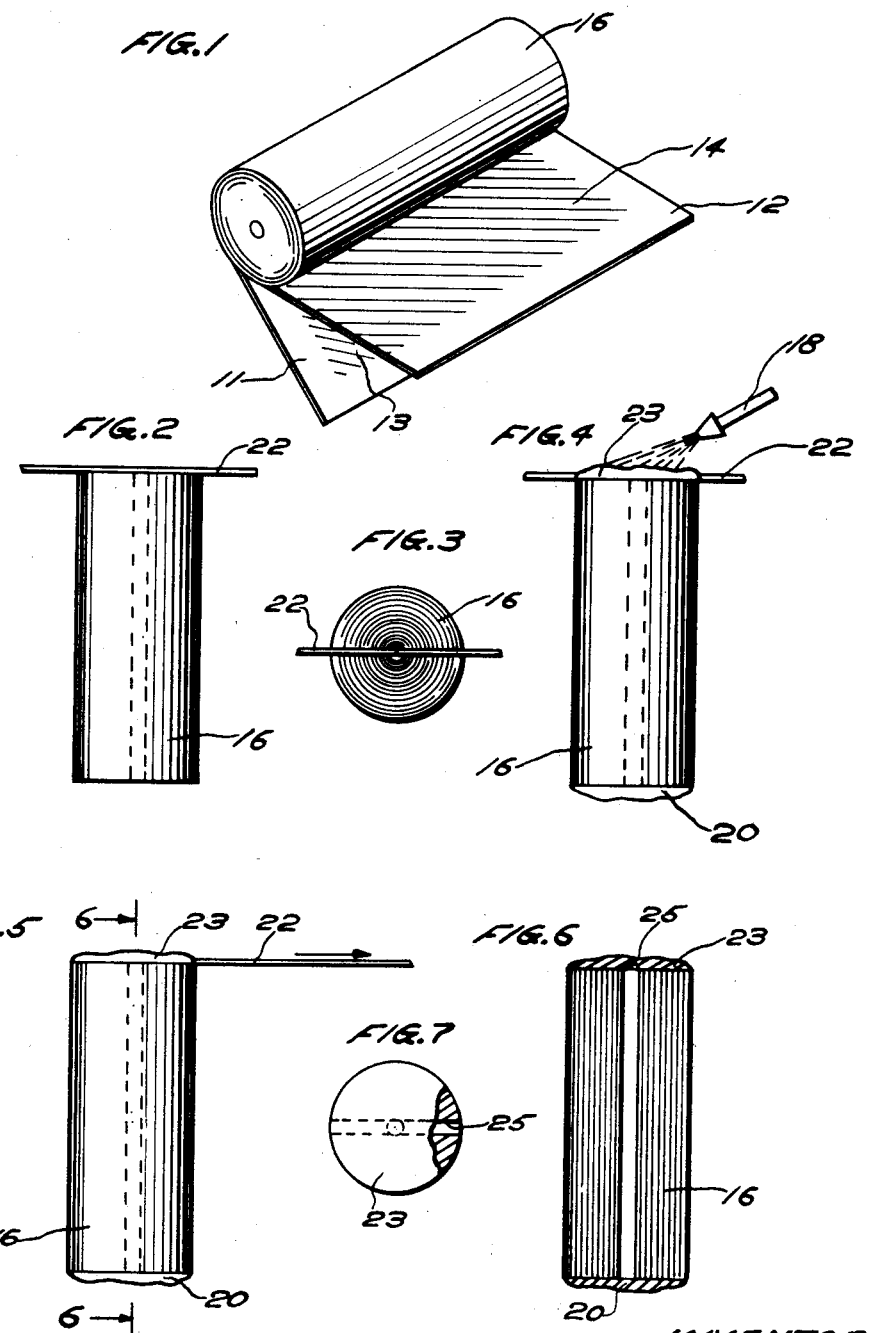
INVENTOR
D.R.CLEMONS
BY C.B. Hamilton
ATTORNEY

United States Patent Office 2,915,808
Patented Dec. 8, 1959

2,915,808

METHODS OF MAKING ELECTRICAL CAPACITORS

Dale R. Clemons, Riverside, Ill., assignor to Western Electric Company, Incorporated, New York, N.Y., a corporation of New York Application April 9, 1956, Serial No. 577,043

1 Claim. (Cl. 29—25.42)

This invention relates to methods of making electrical capacitors and more particularly to methods of making impregnated electrical capacitors.

An object of this invention is to provide a method of making impregnated electrical capacitors.

In a method of making electrical capacitors illustrating certain features of the invention, a plurality of interleaved layers of electrode and dielectric material are wound together into a spiral roll and one end of the roll is covered with solder. A strand is positioned across the opposite end of the roll and this end and the strand are covered with solder. The strand is then withdrawn from the solder, leaving a transverse aperture which intersects each turn of the roll. The roll is then heated whereby the moisture therein exists through the aperture, and an impregnant is then passed into the roll through this aperture.

Other objects and advantages of the invention will become apparent by reference to the following detailed description and the accompanying drawing illustrating a preferred embodiment of the invention, in which Fig. 1 is a perspective view of a plurality of dielectric layers and electrode layers wound into a spiral roll;

Fig. 2 is an elevational view of the roll with a strand positioned across one end;

Fig. 3 is a top view of the disclosure of Fig. 2 showing the manner in which the strand bisects the end of the roll;

Fig. 4 is an elevational view of the roll after solder has been applied to the lower end thereof and as solder is being sprayed onto the upper end thereof to cover the strand;

Fig. 5 is a view of the disclosure of Fig. 4 after solder is sprayed onto the ends of the roll and the strand is partially withdrawn therefrom;

Fig. 6 is a vertical section view of the roll taken on line 6—6 of Fig. 5 showing the aperture in the solder after the strand is withdrawn; and Fig. 7 is a top view of the disclosure of Fig. 5 with the strand withdrawn and a portion of the solder broken away to show the transverse aperture therein.

Referring now in detail to the drawing, a plurality of dielectric strips 11 and 12 having thereon metallized electrode portions 13 and 14, respectively, are shown wound into a cylindrical spiral roll 16. The spiral roll 16 is bound in its cylindrical shape by glue applied to the ends of the dielectric strips 11 and 12 or by any other desirable means, whereupon a solder spraying device 18 (Fig. 4) of a well-known type is used to cover the lower end of the roll 16 with a layer 20 of solder.

A masking strand 22 is then positioned transversely across the upper end of the roll 16 as illustrated in Fig. 2, and the solder spraying device is used to cover this upper end of the roll 16 and the strand 22 with a layer 23 of solder (Fig. 4). The masking strand 22 may be a cotton twine or any other desirable loose or porous material which is reduced in cross section when placed under tension, whereby it can be easily pulled from the solder layer 23.

After the solder layer 23 has been applied to the roll 16, the strand 22 is manually withdrawn from its position in engagement with the upper end of the roll 16, leaving a transverse aperture 25 (Figs. 6 and 7) which intersects each turn of the dielectric strips 11 and 12 in the roll 16. Heat is then applied to the roll 16 in a well-known manner to dry it, the moisture therein exiting through the aperture 25. The roll 16 is then impregnated with a desirable impregnant and in a well-known manner whereby the impregant enters the roll 16 through the aperture 25 to thoroughly impregnate each turn of the strips 11 and 12 in the roll.

If it is desirable the strand 22 can be left in the solder layer 23 for the drying and impregnating operations. The ends of the strand 22 are clipped off adjacent to the roll 16 and heat is applied to the roll to dry it, the strand 22 being loose or porous enough to permit the moisture in the roll to exit therethrough. During the impregnating operation the impregnant passes freely through the porous strand 22 to completely impregnate the roll 16.

The above-described method produces electrical capacitors which are thoroughly dry and which are thoroughly impregnated, since the aperture 25 intersects each turn in the roll 16.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

The method of making a capacitor which comprises assembling a plurality of electrode layers and dielectric layers into interleaved relationship, winding the interleaved dielectric and electrode layers into a roll, positioning transversely across one end of the roll a porous strand of such a nature that the strand is substantially reduced in cross-sectional area when tension is applied thereto, completely covering the ends of the roll with solder, said solder also covering the porous strand, applying tension to the strand in such a way as to reduce the cross-sectional area thereof and to cause the strand to be withdrawn from the solder for leaving a transverse tubular aperture in the solder extending across said one end of the roll, and impregnating the capacitor through said tubular aperture.

References Cited in the file of this patent

UNITED STATES PATENTS

| | | |
|---|---|---|
| 2,274,011 | Strab | Feb. 24, 1942 |
| 2,526,688 | Robinson et al. | Oct. 24, 1950 |

FOREIGN PATENTS

| | | |
|---|---|---|
| 624,074 | Great Britain | May 26, 1949 |